US008897343B2

(12) United States Patent
Gauthier

(10) Patent No.: US 8,897,343 B2
(45) Date of Patent: Nov. 25, 2014

(54) DIVERSITY RECEIVER AND TRANSCEIVER

(75) Inventor: Laurent Gauthier, Pins Justaret (FR)

(73) Assignee: Freescale Semiconductor, Inc., Austin, TX (US)

( * ) Notice: Subject to any disclaimer, the term of this patent is extended or adjusted under 35 U.S.C. 154(b) by 275 days.

(21) Appl. No.: 13/384,253

(22) PCT Filed: Jul. 17, 2009

(86) PCT No.: PCT/IB2009/054215
§ 371 (c)(1),
(2), (4) Date: Jan. 16, 2012

(87) PCT Pub. No.: WO2011/007211
PCT Pub. Date: Jan. 20, 2011

(65) Prior Publication Data
US 2012/0114025 A1 May 10, 2012

(51) Int. Cl.
*H04B 1/38* (2006.01)
*H04B 7/08* (2006.01)

(52) U.S. Cl.
CPC .................. *H04B 7/0811* (2013.01)
USPC ........... 375/219; 375/267; 375/297; 375/299; 375/349; 455/78; 455/84; 455/88; 455/132; 455/134; 455/135; 455/226.1; 455/226.2; 455/226.3

(58) Field of Classification Search
CPC ........ H04B 1/406; H04B 7/04; H04B 1/0458; H04B 1/40; H04B 1/38; H04B 1/7163; H04B 1/005; H04B 1/0064; H04B 1/0483; H04B 1/3877; H04B 2001/0491; H04B 7/0817; H04B 1/0057; H04B 1/48; H04B 1/52; H04B 1/69; H04B 1/71635; H04B 7/0602; H04B 7/0613; H04B 7/0689; H04B 7/0871; H04B 7/2656; H04L 27/04; H04L 27/2647; H04L 27/34; H04L 2025/03414; H04L 2025/03477; H04L 2025/0349; H04L 2025/03598; H04L 25/0204; H04L 25/022; H04L 25/03019; H04L 25/03038; H04L 25/03133; H04L 25/0334; H03H 19/088; H03H 7/38; H03H 11/1291; H03H 2011/0494; H03H 7/40; H03H 11/44; H03H 17/0294
USPC ............ 455/78, 84, 88, 132, 134, 135, 226.1, 455/226.2, 226.3; 375/219, 267, 297, 299, 375/349
See application file for complete search history.

(56) References Cited

U.S. PATENT DOCUMENTS 4,450,585 A * 5/1984 Bell .............................. 455/135
4,584,709 A   4/1986 Kneisel et al.
(Continued)

FOREIGN PATENT DOCUMENTS

| CN | 1090952 A | 8/1994 |
| CN | 1883134 B | 7/2012 |
| JP | 61-030137 A | 2/1986 |

OTHER PUBLICATIONS

International Search Report and Written Opinion correlating to PCT/IB2009/054215 dated Apr. 26, 2010.

*Primary Examiner* — Rahel Guarino

(57) ABSTRACT

A diversity receiver comprises a plurality of receiving paths connected to a receiver circuit. Each of the receiving paths comprises an antenna receiving a signal, connected to a matching network connected to a receive amplifier. The receiver circuit is connected to a signal level comparison circuit for providing a relative comparison value indicating one of the receiving paths receiving the signal with a relative maximum strength. The signal level comparison circuit comprises a comparator circuit connected to the receiver circuit receiving a currently received signal level, and to a logic control unit being arranged to select one of the receive paths to provide the currently received signal to the receiver circuit.

14 Claims, 8 Drawing Sheets

(56) References Cited

U.S. PATENT DOCUMENTS

| | | |
|---|---|---|
| 6,108,526 A | 8/2000 | Van Der Plas |
| 6,504,036 B1 | 1/2003 | Lieb et al. |
| 6,721,550 B1 * | 4/2004 | Okada et al. ............... 455/277.1 |
| 6,728,517 B2 | 4/2004 | Sugar et al. |
| 7,006,809 B2 | 2/2006 | Petrov et al. |
| 7,260,424 B2 * | 8/2007 | Schmidt .................... 455/575.7 |
| 7,587,222 B2 * | 9/2009 | Trachewsky et al. ...... 455/553.1 |
| 7,634,241 B2 * | 12/2009 | Bagchi ....................... 455/188.1 |
| 7,991,375 B2 * | 8/2011 | Afsahi .......................... 455/320 |
| 8,520,400 B2 * | 8/2013 | Rofougaran .................. 361/764 |
| 2006/0067442 A1 | 3/2006 | Tanaka |
| 2009/0054007 A1 * | 2/2009 | Kawabe et al. ................. 455/76 |

\* cited by examiner

DIVERSITY RECEIVER AND TRANSCEIVER

FIELD OF THE INVENTION

This invention in general relates to radio frequency communication systems and more specifically to a diversity receiver, a diversity transceiver and to a short range device (SRD) application using antenna diversity.

BACKGROUND OF THE INVENTION

Antenna diversity is an approach to cope with multipath fading of received signals in wireless communication systems, as encountered for example in radio frequency (RF) communication inside or between buildings, where multipath transmission may cause destructive interferences and therefore reduce the range for reliable communication.

As shown for example in FIG. 1, a communication system 10 without antenna diversity may comprise a transmitter (TX) or sender 12 with a single transmitter-side antenna 14, and a receiver (RX) 16 with a receiver-side antenna 18. A signal may be a change of a physical quantity carrying information, for example an electromagnetic wave. A signal may for example be a radio frequency signal or an optical signal. The signal, i.e. for example the electromagnetic waves comprising an information to be transmitted from a sender or transmitter to a receiver, radiated from the transmitter-side antenna 14 may for example be reflected at a first wall 20 and a second wall 22, therefore generating in the shown example three transmission paths for transmission of three instances or multipath representations of the signal 24, 26, 28 potentially interfering with each other at the receiver-side antenna 18.

For improved received signal quality, the signal 24, 26, 28 may be transmitted using more power or the receiver 16 may be configured for providing more received signal sensitivity. However, this may result in very strict transmission link margins.

As shown for example in FIG. 2, a different communication system may be a diversity antenna system 30 comprising a transmitter 12 having a single transmitter-side antenna 14 and a diversity receiver 32 having two or more receiver-side antennas 34, 36 which may receive different multipath signals 24, 26, 28; 38, 40, 42 and therefore resulting signals received at the different antennas may not be affected simultaneously by the same interferences. The signals received by each antenna 34, 36 are then compared, and the antenna providing the better reception or the best received signal quality (for example higher signal-to-noise ratio) as measured by the receiver is selected.

For bi-directional communication, transceivers may be used providing both transmitter and receiver functionality. A typical diversity transceiver is shown in FIG. 3. The transceiver 44 may comprise a transmitter 46 connected to a transmit antenna 48 and two or more receivers 50, 52, each connected to a different receive antenna 54, 56. In the shown example, 3 pins 58, 60, 62 are used (2 for RX, 1 for TX) for antenna connection. A microcontroller unit (MCU) 64 may be connected to the transmitter for providing the data to be transmitted and may be connected to the receivers for receiving data and signal level values on the receive antennas and evaluate a signal strength or signal level and decide which antenna to use. For using a MCU for managing the antenna diversity function, received signals may be converted from the received analog representation to a digital representation using an analog-to-digital converter (not shown). During signal reception, the MCU may be in an ON-mode, i.e. the MCU may be awake.

In telecommunications, low-power communication devices or Short Range Devices (SRD) may also be subject to multipath fading. A SRD is a restricted radiation device, for example a wireless microphone, a radio-controlled garage door opener, or other device, for example a medical or automotive device, using wireless communication, wherein a distance between transmitter and receiver is typically only a few meters. Many of these devices for example communicate using the industrial, scientific and medical (ISM) radio bands, which were originally reserved internationally for the use of RF electromagnetic fields for industrial, scientific and medical purposes other than communications. Communications equipment must usually accept any interference generated by ISM equipment. ISM bands are for example in the range of 315 MHz, 433 MHz or 868 MHz. Short range devices are often small, which may restrict the area available for several antennas or may limit the available power for a receiver side digital processing unit and connected analog-to-digital converter for diversity receiver signal processing.

SUMMARY OF THE INVENTION

The present invention provides a diversity receiver, a diversity transceiver and a short range device (SRD) application using antenna diversity as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
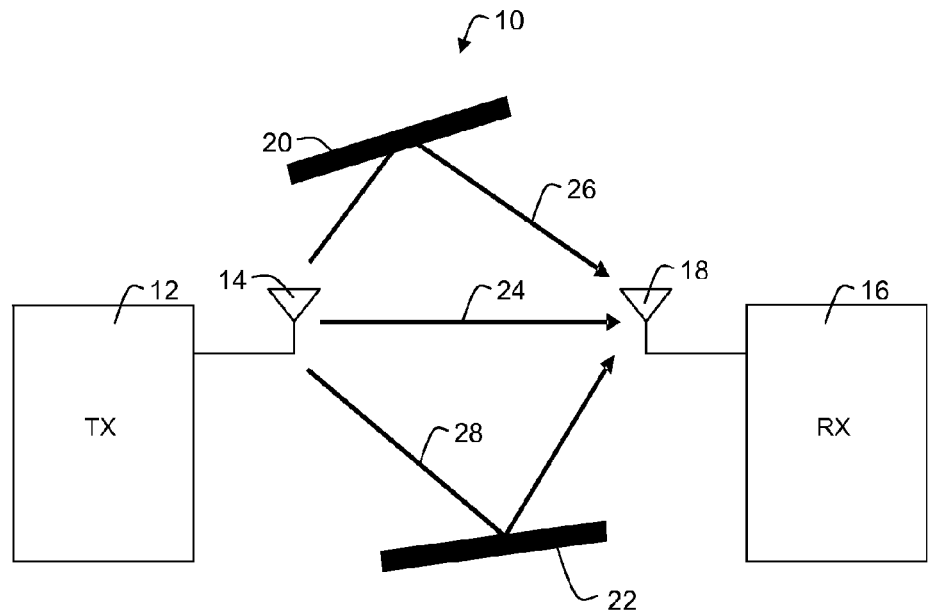
FIG. 1 schematically shows an example of a prior art RF communication system experiencing multipath transmission between a single transmitter-side antenna and a single receiver-side antenna.
Figure 2:
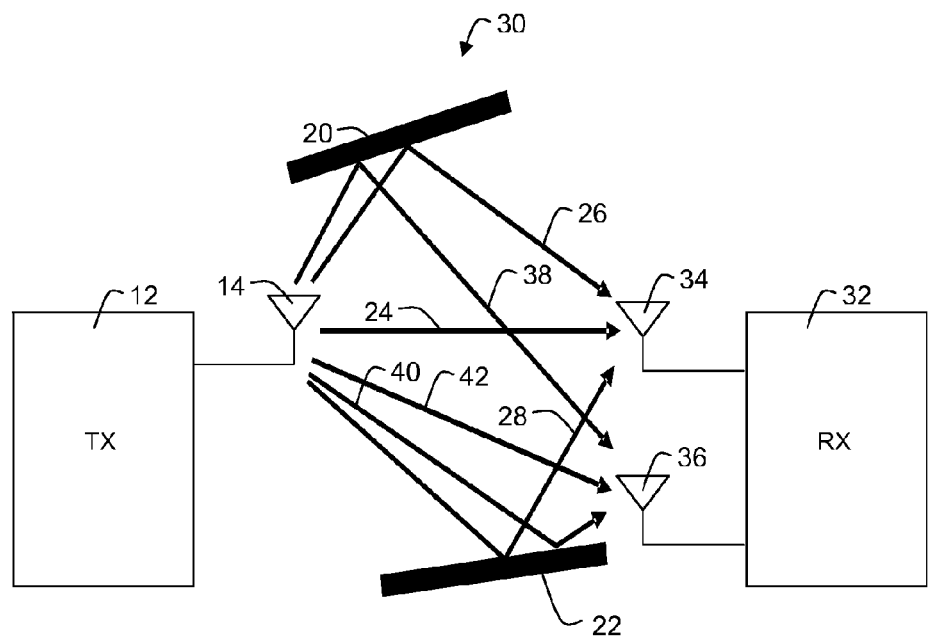
FIG. 2 schematically shows an example of a prior art RF communication system experiencing multipath transmission between a single transmitter-side antenna and a dual receiver-side antenna.
Figure 3:
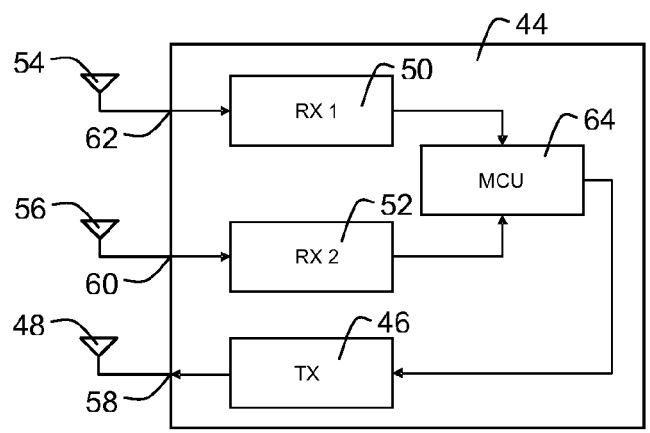
FIG. 3 shows a schematic block diagram of an example of a prior art diversity transceiver.
Figure 4:
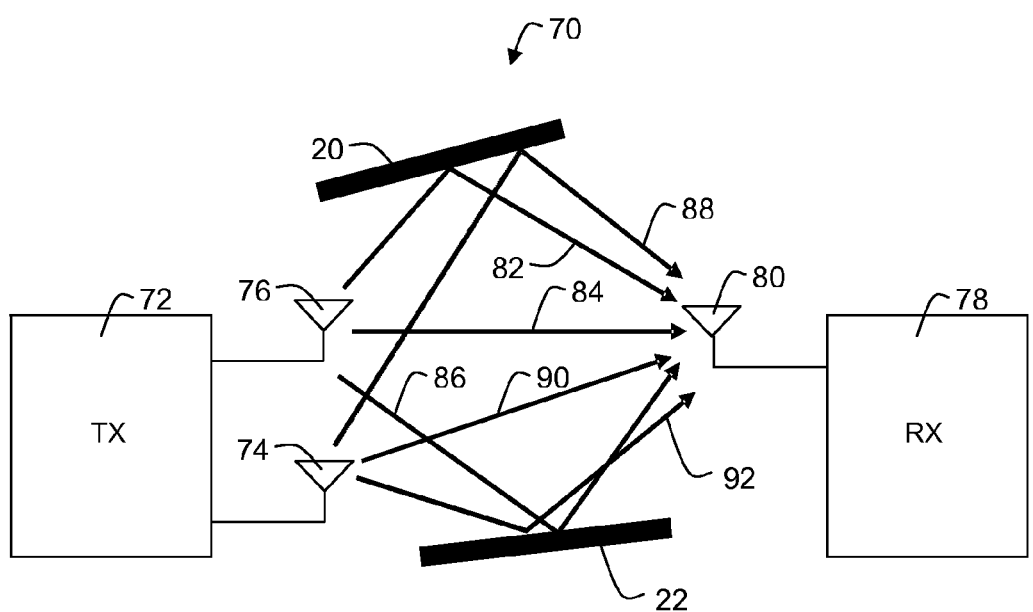
FIG. 4 shows a schematic block diagram of a first example of a diversity antenna system.

Referring to FIG. 4, a first schematic example of a diversity antenna system is shown. The shown antenna diversity system 70 comprises a diversity transmitter 72 having a plurality of transmitter-side antennas 74, 76. The diversity transmitter may be arranged to generate at least one sequence of signals comprising data packets having payloads identical and identifiers different for each of the data packets. Each of the identifiers may identify a corresponding one of the plurality of transmitter-side antennas 74, 76. And the diversity transmitter 72 may be arranged to successively transmit at least two of the signals at different points in time on the corresponding ones of the plurality of transmitter-side antennas 74, 76. And the shown diversity antenna system 70 may comprise a receiver 78 comprising a first receiver-side antenna 80. The receiver 78 may be arranged to successively receive the signals of the at least one sequence on the first receiver-side antenna 80, and to suspend receiving of subsequent signals of the at least one sequence when an error check of a data packet comprised in a received signal of the at least one sequence indicates a successful reception.

By using transmitter-side antenna diversity the receiver may encounter less power consumption. The transmitter may generate sequences of signals, each signal comprising a data packet, wherein all data packets carry the same payload to be transmitted together with an identifier for distinguishing the packets. A sequence of signals may be applied to the transmitter-side antennas for redundant transmission of the payload information, each signal and therefore each packet being applied to a different transmit antenna at a different time, the transmitter therefore transmitting the payload information with a spatial and temporal multiplex.

As an example, the receiver may receive multipath representations 82, 84, 86 of a first signal sent on the first transmitter-side antenna, and multipath representations 88, 90, 92 of a second signal sent on the second transmitter-side antenna, the first signal comprising a first transmitted data packet carrying a payload information and the second signal comprising a second data packet carrying an identical payload information. The receiver may be arranged to sequentially receive the transmitted signals at least at the first receiver-side antenna 80, apply an error check to a data packet comprised in the received signal and suspend receiving of subsequent signals of the same sequence when a result of the error check indicates that the packet has already been successfully received. A decision to suspend receiving of subsequent signals of the sequence may be taken after complete reception of the signal and performing the error-check, which may for example be a cyclic redundancy check (CRC), of the packet comprised in the received signal.

Prior to complete reception of a data packet, the receiver may for example try to detect a preamble in a signal being received and may skip the signal and wait for the next preamble in a packet of a subsequent signal, when the preamble cannot be detected correctly or a signal level is found below an acceptance threshold.

It should be noted that the term "received signal" may refer to a signal which has been received completely, i.e. wherein a comprised data packet has been transferred completely and can therefore be analyzed, e.g. by performing an error check, whereas the term "signal being received" may refer to a signal being currently received, i.e. which has not necessarily been received completely.

Figure 5:
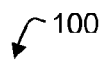
FIG. 5 shows a schematic block diagram of an example of a transmitted data packet structure.
Figure 5:

Referring also to FIG. 5, a schematic example of a transmitted data packet structure 100 is shown. A data packet is a formatted unit of data comprising control information and usually user data, i.e. the payload or payload information. Transmitting a data packet in a wireless communication system may refer to radiating a signal, for example an electromagnetic radio wave, comprising the data packet information such that a receiver may receive the signal carrying the data packet.

As shown, a data packet 100 may comprise a preamble 102, a header 104 and payload information 106. Payload or payload information 106 are the data a user of the transmission system may want to deliver from the transmitting side to the receiving side of the system. It may for example be an analog representation of digitally encoded information to be transmitted. Preamble 102 and header 106 together may comprise the control or signalling information. The preamble 102 may be known to the receiver for verifying a beginning and identifying the type of transmission. The header 104 may comprise more control information. The identifier may be part of the signalling data required for transmission management and may be part of the header information of a data packet 100.

However, in the context of this specification, a data packet may also be any information carried by a signal, having distinct beginning and end and comprising at least the identifier for identifying a particular data packet when compared with other data packets.

Referring back to FIG. 4, suspending reception of subsequent data packets may comprise de-activating receiving antennas 80 or receiver circuitry connected to the antennas for example for reduced power consumption. However, it may also comprise ignoring, rejecting or suspending evaluating of data packets 100 carrying the payload information 106 after successful reception of a preceding data packet carrying the same payload information.

An error check, for example a cyclic redundancy check (CRC), for the packet may be performed by the receiver 78 after complete reception of a packet. When the error check indicates an erroneous data packet, the receiver may continue receiving and verifying the second signal of the sequence. This may be continued for all signals of a sequence until a signal with a valid packet is detected. The identifier of the successful packet may then identify the best transmitter-side antenna for transmission.

Signals, such as radio frequency signals, radiated from the transmitter-side antennas 74, 76 comprising the data packets may be differently polarized for at least two of the plurality of transmitter-side antennas 74, 76. In the case of a dual transmitter using two different transmit antennas, signals may for example be polarized orthogonally to each other. For example, the multipath representations 82, 84, 86 of a signal radiated from a first transmitter-side antenna 76 may be differently polarized than the multipath representations 86, 88, 90 of a signal radiated from a second transmitter-side antenna 74. This may for example enhance reception quality of the signals carrying the data packets and at the same time allow for more compact layout of the transmitter antenna diversity by having the transmitter-side antennas 74, 76 closer together with only reduced increase in interference between radiated signals.

Interferences and multipath fading may be frequency-dependent. Therefore, alternatively or additionally, the antenna diversity system 70 may be arranged for frequency multiplexing, wherein the signals comprising the data packets of the sequence may be transmitted on the corresponding ones of the plurality of transmitter-side antennas 74, 76 using frequency multiplexing. Depending on the type of signals and modulation used, frequency multiplexing may for example refer to using different frequency ranges, different carrier frequencies, or different bitrates. Frequency multiplexing may be used for enhanced quality of reception and better distinguishing received packets at the receiver side. And the presented antenna diversity system may offer the possibility of bi-band communication.

Figure 6:
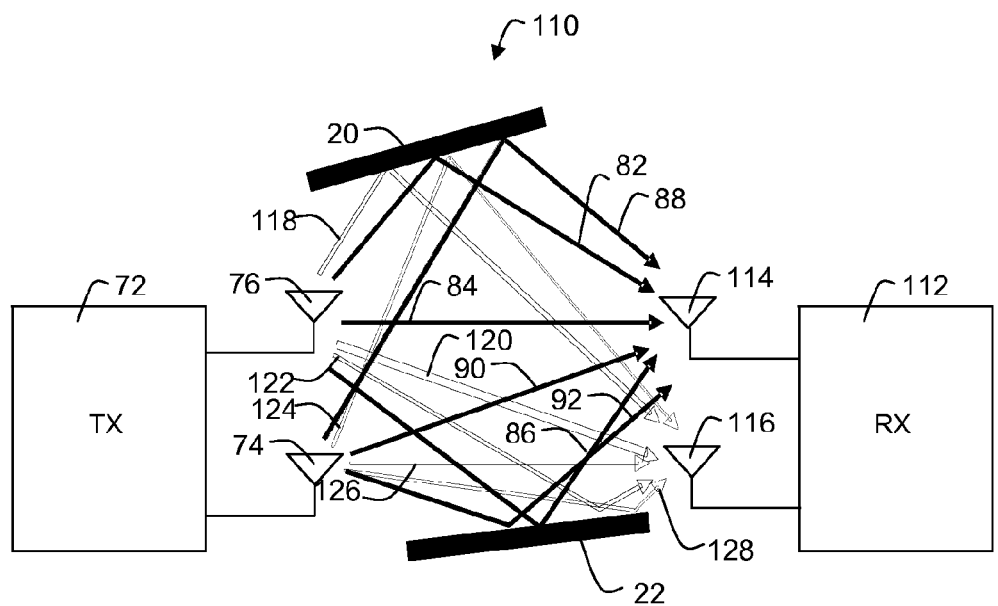
FIG. 6 shows a schematic block diagram of a second example of a diversity antenna system.

Referring now to FIG. 6, a second example of a diversity antenna system 110 is schematically shown, wherein the receiver may be a diversity receiver 112 for multipath reception comprising at least a second receiver-side antenna 116 receiving the at least one sequence of signals, being arranged to measure one or more quality characteristics of the signals being received on the first and the at least second receiver-side antenna; and comprising a logic control unit (not shown here) arranged to select a best receiver-side antenna depending on the one or more measured quality characteristics. As shown in FIG. 6, the diversity antenna system 110 may comprise a plurality of receiver-side antennas 114, 116, for example two as shown in FIG. 6, allowing for multipath reception on each of the receiver-side antennas 114, 116. One or all receiver-side antennas 114, 116 may receive multipath representations (82, 84, 86; 88, 90, 92); (118, 120, 122; 124, 126, 128) of each of the data packets of the transmitted sequence. A quality measurement of signals being received may comprise a determination and evaluation of one or more quality characteristics of signals being received, for example by determining a signal strength or level and comparing it to a threshold level and trying to correctly detect a preamble contained in the signal being received. If the measured signal characteristics do not indicate a valid signal, the particular antenna may not be selected for receiving.

A quality measurement may also comprise comparing received signals, for example by directly comparing signal levels. For example, when more than one receive antenna are receiving a signal with valid quality characteristics, the best antenna may be selected, for example by relative comparison of signal levels.

A logic control unit comprised in the receiver 112 may be a processor, such as a microcontroller unit (MCU), or may refer to an algorithm executed on a processor. However, a logic control unit may be implemented using logic circuitry or may for example be implemented as a state machine, for example implemented in a programmable logic array (PLA).

The presented antenna diversity system having a diversity transmitter and diversity receiver may allow for any combination of diversity antenna usage: two or more transmit antennas and one receive antenna, two or more transmit antennas and two or more receive antennas, or one transmit antenna and two or more receive antennas.

Figure 7:
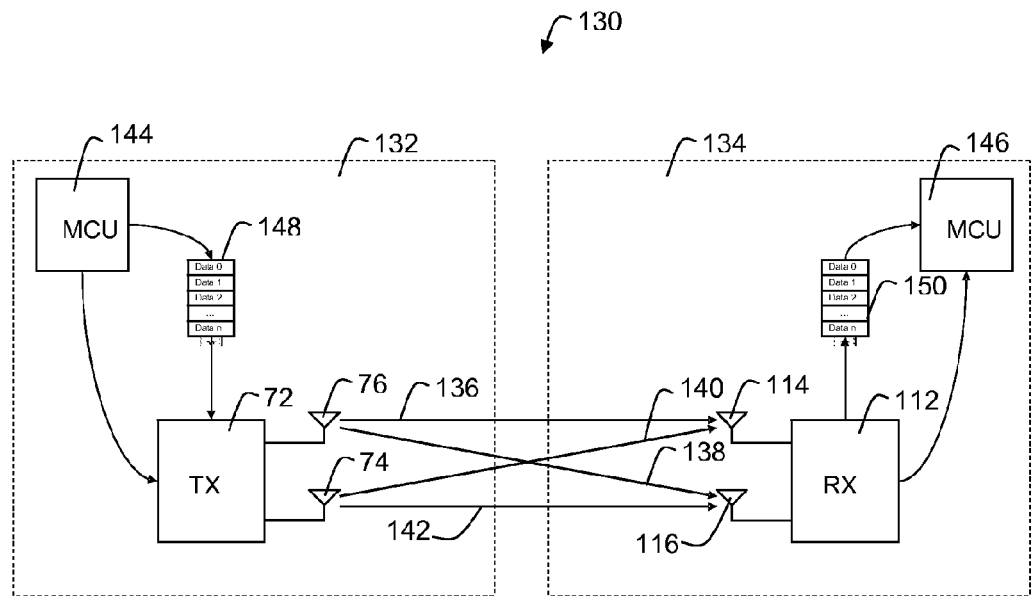
FIG. 7 shows a schematic block diagram of a third example of a diversity antenna system.

Referring now to FIG. 7, a schematic diagram of a third example 130 of a diversity antenna system is shown. Here, the transmitter side 132 may comprise a MCU or other processing unit 144 and a transmit buffer 148. The MCU 144 may insert data into the transmit buffer 148 to be sent as payload from the transmitter side 132 to the receiver side 134. And the MCU 144 may be connected to the transmitter 72 and enable transmission of the data stored in the transmit buffer 148. The transmitter 72 may read the data from the transmit buffer 148, generate a first packet 136, 138 and a second packet 140, 142 and transmit the first packet 136, 138 on the first transmit antenna 76, and later transmit the second packet 140, 142 on the second antenna 74.

The diversity receiver 112 may try to receive the first packet 136 on the first receiver-side antenna 114, may try to receive the first packet 138 on the second receiver-side antenna 116 and may select the antenna as the best receiver-side antenna, where a quality measurement of signals being received, such as received signal level and successful preamble decoding indicate a valid signal quality. In the case of more than one signal being received at different receive antennas the quality measurement may comprise a relative comparison of signals being received, for example relative comparison of signal levels, for selection of a best receiver-side antenna. After complete reception of a data packet, an error check, for example a CRC, may indicate a successful reception of the packet.

In the case of failed reception of the first packet 136, 138 on the first and on the second receiver-side antennas 114, 116, the receiver 112 may try to receive the next packet of the transmitted diversity sequence of data packets. Here, the receiver 112 may try to receive the second packet 140, 142 on the first and the second receiver-side antenna 114, 116 and may select the antenna as the best receiver-side antenna, where a quality measurement indicates a valid signal quality. After a data packet has been completely received and an error check has been performed on the complete data packet which indicates successful reception, the receiver 112 may insert the particular packet (or its payload information) into a receive buffer 150 connected to the receiver 112. A receiver-side MCU or other processing unit 146 may then read the received data from the receive buffer 150.

Figure 8:
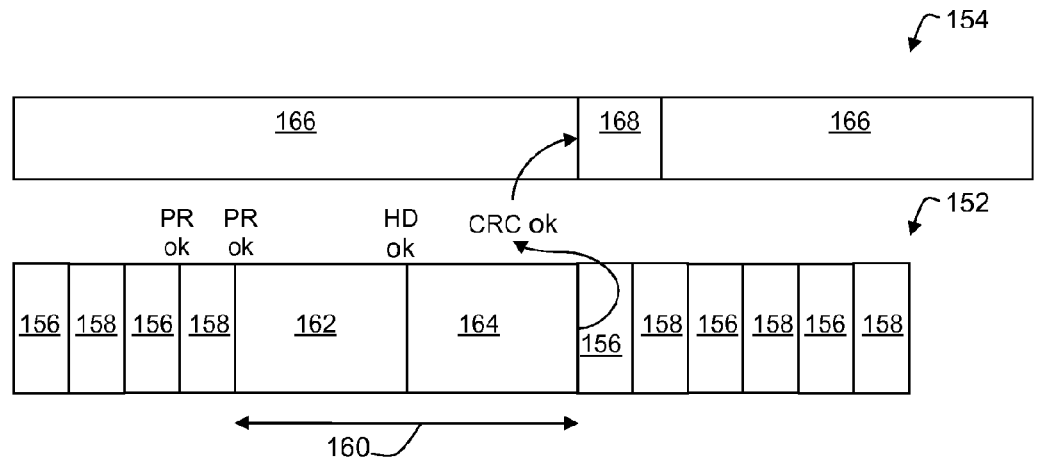
FIG. 8 schematically shows an example of states of a diversity receiver and a connected receiver-side MCU during operation of the third example of a diversity antenna system.

As described, the receiver 112 may comprise a receiver-side buffer 150 for storing at least a received data packet and a processor 146, such as the shown MCU. Referring now also to FIG. 8, an example of states of a diversity receiver 152 and a connected receiver-side MCU 154 during operation of the third example of a diversity antenna system is schematically shown. The processor or MCU may have an OFF-state 166 and an ON-state 168 and may be arranged to be switched from the OFF-state 166 to the ON-state 168 for at least reading the received data packet when the successful reception is indicated. The processor may be switched OFF 166, therefore consuming only little or no power until successful reception of a packet. The receiver may be connected to the processor for sending a wake-up signal when new valid data are available for reading in the receive buffer. FIG. 8 shows a schematic diagram of an example of receiver states 152 and corresponding MCU states 154 over time. The MCU may remain in OFF-state 166, while the receiver may detect a preamble on the first receive antenna 156 and the second receive antenna 158. However, preambles may be invalid and the receiver may continue with preamble detection. Again a preamble may be detected 156 on the first antenna and on the second antenna 158, both preambles for example being valid (PR ok). Therefore, the receiver may select 160 the first antenna depending on a higher received signal level, may detect the header information 162 inside the packet and on successful header decoding, may receive the contained payload data and may write the data into the receive buffer 164, may for example check for errors and for example on successful CRC test, may send a wake-up signal to the MCU. Then the MCU may read the buffered data and may go to sleep again (i.e. switch to OFF-state 166) afterwards, while the receiver may resume preamble detection on both receiver-side antennas 156, 158. Since the MCU can be in OFF-state, while the antenna diversity management is carried out by a state machine, power consumption of an application comprising the diversity antenna system may be low. Therefore, the application may for example be a battery powered application.

Figure 9:
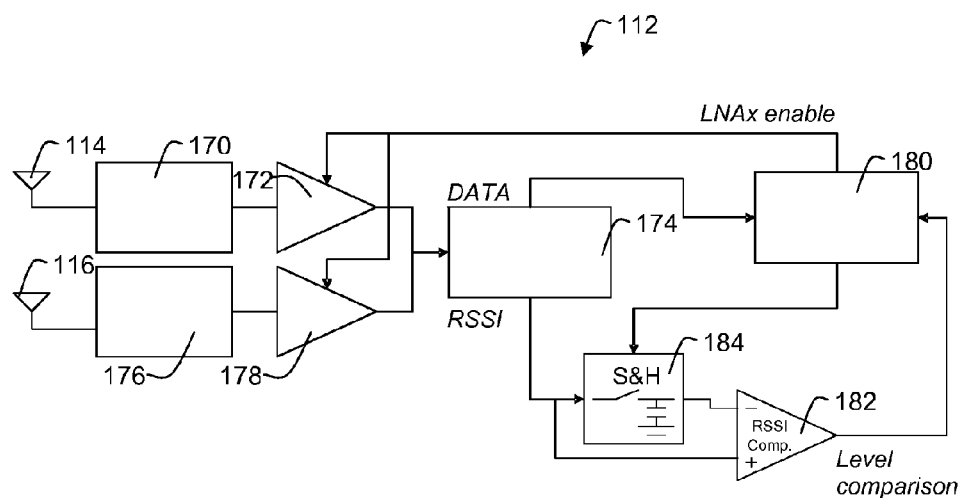
FIG. 9 shows a schematic block diagram of an example of an embodiment of a diversity receiver.

Referring to FIG. 9, an example of an embodiment of a diversity receiver 112 is shown. The diversity receiver 112 may be a diversity receiver comprised in an antenna diversity system 110, 130 as described above or the shown diversity receiver 112 may be used with a different antenna diversity system, wherein the diversity receiver is subject to multipath reception on its antennas. A diversity receiver 112 may comprise a plurality of receiving paths connected to a receiver circuit 174, each of the receiving paths comprising an antenna 114, 116 receiving a signal connected to a matching network 170, 176 connected to a receive amplifier 172, 178, the receiver circuit 174 being connected to a signal level comparison circuit for providing a relative comparison value indicating one of the receiving paths receiving the signal with a relative maximum strength, the signal level comparison circuit comprising a comparator circuit 182 connected to the receiver circuit 174 receiving a currently received signal level, and to a logic control unit 180 being arranged to select one of the receive paths to provide the currently received signal to the receiver circuit 174.

The example embodiment of a diversity receiver shown in FIG. 9 may comprise the comparator circuit 182 connected to the receiver circuit 174 and the logic control unit 180 for providing a relative comparison result of signals received by the plurality of receiving paths, i.e. at least a first and at least a second receiving path. The shown comparator circuit 182 may deliver a relative comparison result of signal levels received by the first and the second receiving path, i.e. signal levels may be compared without prior determination of the absolute received signal level values. This may avoid codeword comparison by a digital processor and preceding AD conversion of received signal levels.

And the signal level comparison circuit may comprise at least one sample & hold buffer circuit 184 connected to the receiver circuit 174 and the comparator circuit 182 and may receive control signals from the logic control unit 180. A sample & hold buffer circuit 184 may be any buffer circuit configured to hold a received analogue signal value steady for at least a short time, for example a capacitor combined with a switch. The logic control unit 180 may trigger the sample & hold circuit corresponding to triggering switching between receive signal paths in order to store a previously received signal level for comparison with a currently received signal level.

Application of sample & hold circuit and comparator as described above may avoid digital-to-analog conversion of the received signal data and the receiver may control receive path selection without AD conversion of received signals. Therefore, the presented receiver may be a low cost analog implementation for a diversity receiver.

In an embodiment of the diversity receiver, the currently received signal may comprise at least one data packet and the receiver circuit 174 may be connected to the logic control unit 180 for providing at least a part of the received data packet to the logic control unit 180.

The logic control unit 180 may be arranged to successively connect a first receiving path comprising a first receiver-side antenna 114, a first matching network 170 and a first receive amplifier 172 to the receiver circuit 174, and at least a second receiving path comprising the at least second receiver-side antenna 116, at least a second matching network 176 and at least a second receive amplifier 178 to the receiver circuit 174. Each receiver-side antenna 114, 116 may be coupled to a matching network 170, 176, which may for example generate a resulting received signal equal to the sum of the different signals of the multipath transmission.

The receive amplifiers 172, 178 may for example be low-noise amplifiers (LNA), which may be used in communication systems for amplifying very weak signals captured by an antenna. An LNA may often be located very close to the antenna, so that losses in the feedline may become less critical. An LNA may for example be placed at the front-end of a radio receiver circuit. Using an LNA, the noise of all the subsequent stages may be reduced by the gain of the LNA, while the noise of the LNA itself may be injected into the received signal. Thus, it is necessary for an LNA to boost the desired signal power while adding as little noise and distortion as possible so that the retrieval of this signal is possible in the later stages in the system. As shown in FIG. 9, although there may be one receive path for each receiver-side antenna 114, 116, the receiver paths may be connected to a common receiver circuit 174 stage for signal retrieval. The receiver circuit 174 may for example be a super heterodyne receiver.

Providing at least a part of a received data packet to the logic control unit 180 may for example when being used in a system such as the described above refer to providing at least a part of the signaling data, which may be a preamble or a header or both, to the logic control unit 180. Depending on the implementation of the receiver circuit 174 and of the logic control unit 180, the logic control unit 180 may receive the complete data packet for later insertion of the payload data for example into a receive buffer, or the logic control unit 180 may be arranged to control the receiver circuit 174 to perform this task. The logic control unit 180 may receive the preamble of a data packet and try to decode it. The logic control unit 180 may be arranged to successively switch between receiving paths, causing the receiver circuit 174 to sequentially provide preamble data received on more than one of the receiver-side antennas 114, 116 to the logic control unit 180. If only one of the receive antennas 114, 116 receives valid preamble data, the corresponding receive path may be selected by the logic control unit 180. If more than one receive antenna 114, 116 receive valid preamble data, the logic control unit 180 may be arranged to select a receiving path depending for example on a signal strength comparison of the received signals. For example, the antenna selection for receiving packets may be done by the logic control unit 180 by measuring the strength or level of the incoming signals during the preamble on each antenna, check, if the preamble can be correctly decoded on each antenna and by selecting either the only antenna with correct preamble decoding or if more than one received signals may be correctly decoded, selecting the antenna with the best, that is the highest, signal level. The signal strength or signal level may for example be measured according to a received signal strength indication (RSSI) metric, which is a measurement of the power present in a received radio signal. RSSI is generic radio receiver technology metric, as used in wireless networking based on the IEEE 802.11 protocol family.

The logic control unit 180 may be implemented as part of a processor, either in hardware or at least partly in software. However, the logic control unit 180 may instead be implemented for example as a state machine.

Figure 10:
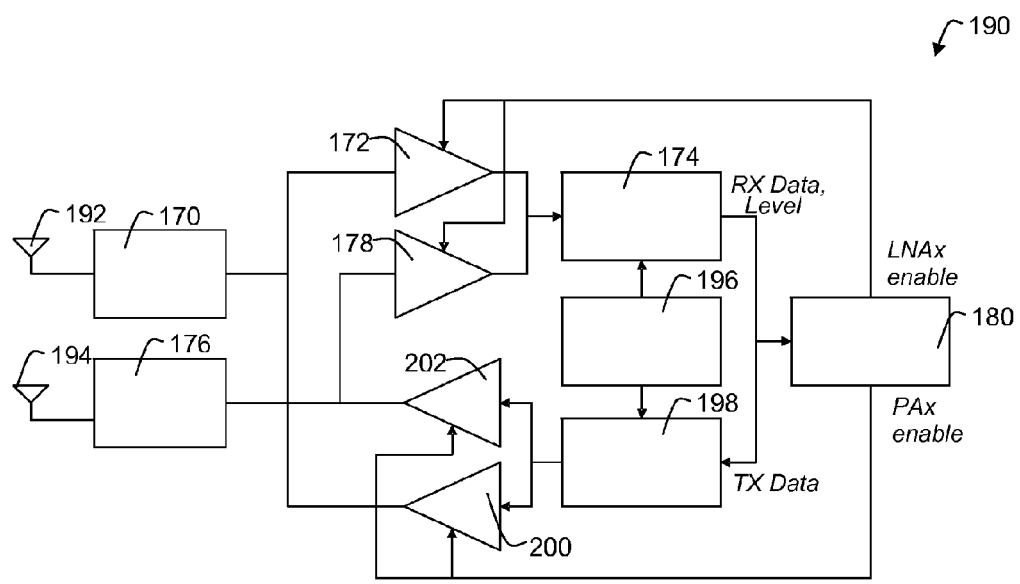
FIG. 10 shows a schematic block diagram of an example of a first embodiment of a diversity transceiver.

As described before, an antenna diversity system may for example be an antenna system having a plurality of transmitter-side antennas and receiver-side antennas. Referring now also to FIG. 10, the diversity receiver 112 may in this case be implemented as a diversity transceiver 190 for bi-directional communication, wherein the logic control unit is arranged to switch the diversity transceiver 190 either into a transmit mode or a receive mode and the antennas 192, 194 are arranged as receiver-side antennas or as transmitter-side antennas depending on the mode. The transmitter-side antennas and receiver-side antennas may be the same antennas 192, 194. Therefore, the number of pins required for antenna connection may not be higher than the number of transmitter-side antennas and the number of receiver-side antennas. In the shown example, the reduced number of pins for antenna connection may therefore be 2.

And the diversity receiver implemented as a diversity transceiver 190 may comprise a phase-locked loop (PLL) circuit 196 connected to the receiver circuit 174 and a transmit amplifier driver circuit 198. This may allow using the same PLL circuitry for modulation and demodulation of data signals before transmission and after reception via the antennas 192, 194. PLL programming may be done automatically without any load for an MCU. The transmit amplifier driver circuit 198 may be a power amplifier driver circuit providing data signals to be transmitted to one or more transmit amplifiers 200, 202, which may be configured as power amplifiers.

The diversity transceiver 190 may be designed to use as many circuit components as possible both for transmission and reception of signals. Only receive amplifiers 174, 176, which may for example be LNAs, and transmit amplifiers 200, 202, which may for example be power amplifiers, may be unique for each receive path and transmit path. Therefore, according to an embodiment of the receiver comprising a plurality of transmit amplifiers 200, 202 for providing transceiver functionality, the diversity transceiver 190 may comprise the receiver circuit 174, the transmit amplifier driver circuit 198, the phase-locked loop circuit 196, the logic control unit 180 and the plurality of antennas 192, 194, matching networks 170, 176, receive amplifiers 172, 178 and also transmit amplifiers 200, 202, wherein the plurality of antennas 192, 194, matching networks 170, 176 and receive amplifiers 172, 178 may be connected as the corresponding plurality of receive paths being connected to the receiver circuit 174, and the plurality of antennas 192, 194, matching networks 170, 176 and transmit amplifiers 200, 202 may be connected as a corresponding plurality of transmit paths being connected to the transmit amplifier driver circuit 198. And the logic control unit 180 may be capable of activating in the receive mode one of the receive paths or sequentially activating two or more of said receive paths. And the logic control unit 180 may be capable of activating in the transmit mode one of the transmit paths or sequentially activating two or more of the transmit paths.

And the described receiver may be implemented as a single integrated circuit. For example, instead of combining independent transmitter and receiver circuitry within a common box and only adding switching circuitry for choosing either the transmitter or the receiver, the shown transceiver 190 may be implemented as a monolithic circuit. Further, the transceiver circuits may be identical for all communicating partner entities.

However, a diversity transceiver 190 may also be used with a different receiver functionality, for example using a different mechanism for diversity antenna selection with or without signal level comparison circuit in order to establish a stable communication, for example by evaluating other received signal parameters. The diversity transceiver 190 may then comprise one receiver circuit 174, one transmit amplifier driver circuit 198, one phase-locked loop circuit 196, one logic control unit 180 and a plurality of antennas 192, 194, matching networks 170, 176, receive amplifiers 172, 178 and transmit amplifiers 200, 202, wherein the plurality of antennas 192, 194, matching networks 170, 176 and receive amplifiers 172, 178 may be connected as a corresponding plurality of receive paths being connected to the receiver circuit 174, and the plurality of antennas 192, 194, matching networks 170, 176 and transmit amplifiers 200, 202 may be connected as a corresponding plurality of transmit paths being connected to the transmit amplifier driver circuit 198. And the logic control unit 180 may be capable of activating in a receive mode one of the receive paths or sequentially activating two or more of the receive paths. And the logic control unit 180 may be capable of activating in a transmit mode one of the transmit paths or sequentially activating two or more of the transmit paths. This diversity transceiver may be implemented as a single integrated circuit.

Figure 11:
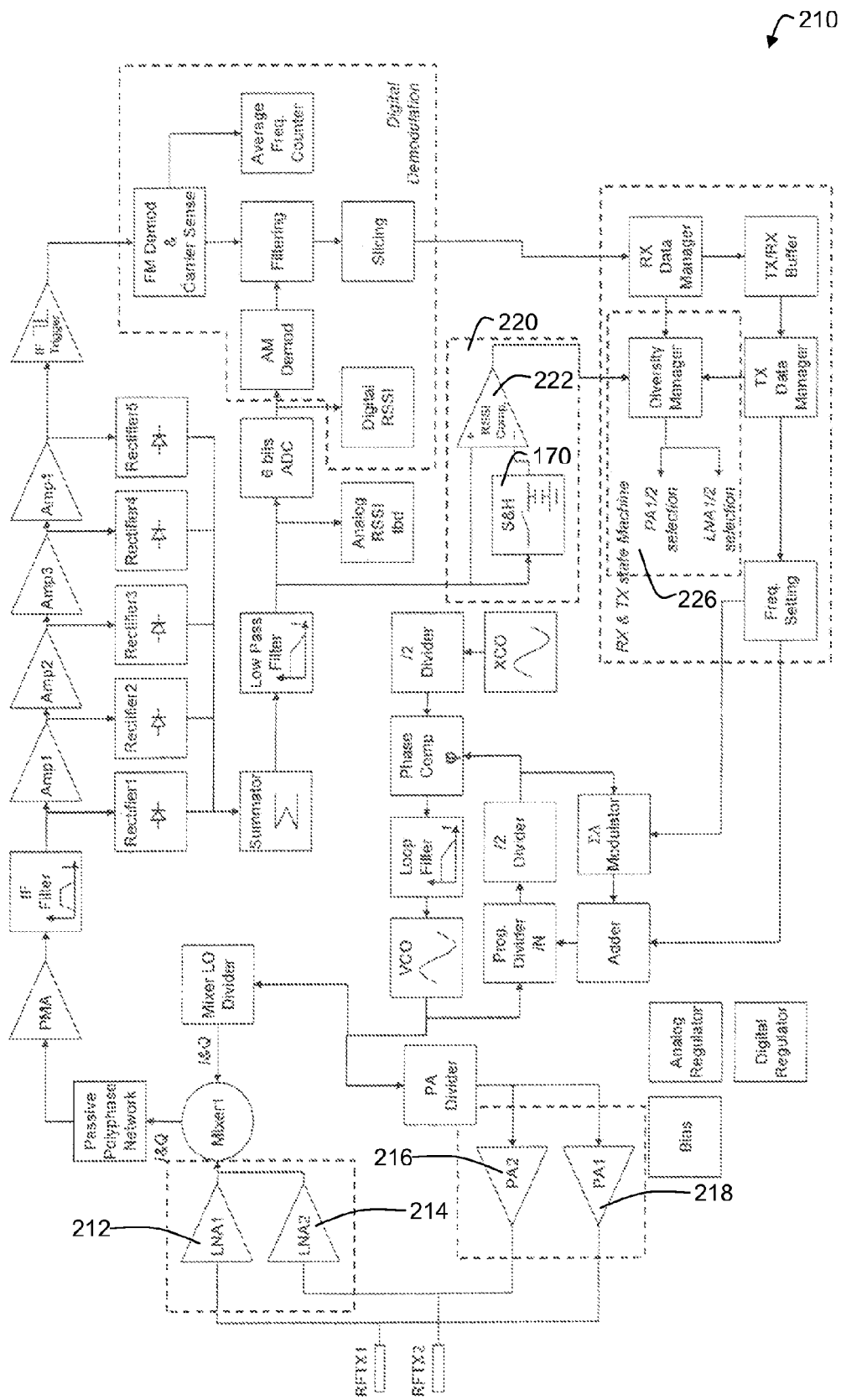
FIG. 11 shows a schematic block diagram of an example of a second embodiment of a diversity transceiver.

Referring now to FIG. 11, a schematic block diagram of an example of a second embodiment 210 of a diversity transceiver is shown. The diversity transceiver 210 may comprise low noise amplifiers 212, 214 as receive amplifiers and power amplifiers 216, 218 as transmit amplifiers. And the shown diversity transceiver may comprise a received signal comparison circuit 220 having a comparator 222 and a sample & hold buffer circuit 224. Further, the shown diversity transceiver may comprise a logic control unit 226 or Diversity Manager for selecting the first power amplifier 218 or the second power amplifier 216 or the first LNA 212 or the second LNA 214 and therefore the corresponding transmit paths or receive paths. The logic control unit 226 may be implemented as a state machine together with data manager units for received data and data to be transmitted. As shown, a common buffer may be used for receive and transmit data. Furthermore, the state machine may comprise a frequency setting unit for controlling modulation of transmit data onto signals to be transmitted. The described low noise amplifier, power amplifier, sample & hold and comparator circuitry may only require very few die area. If for example the shown transceiver circuit may be implemented on a 3.3 mm$^2$ silicon area, the described low noise amplifier, power amplifier, sample & hold and comparator circuitry may for example require less than 4% of the area.

Figure 12:
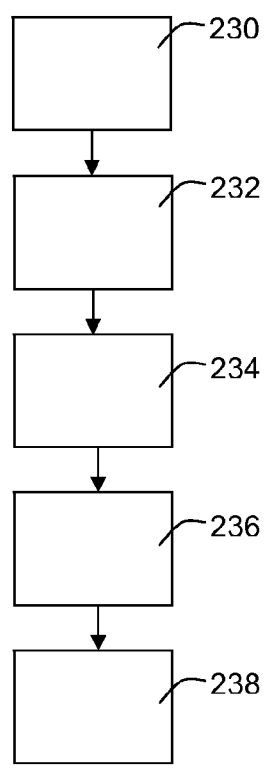
FIG. 12 shows a schematic flow diagram of an example of a method of transmitting data packets between a diversity transmitter having a plurality of transmitter-side antennas and a receiver having at least a first receiver-side antenna.

Referring now to FIG. 12, a schematic flow diagram of an example of a method of transmitting data packets between a diversity transmitter having a plurality of transmitter-side antennas and a receiver having at least a first receiver-side antenna, comprising generating 230 at least one sequence of signals comprising data packets having payloads identical and identifiers different for each of the data packets, each of the identifiers identifying a corresponding one of the plurality of transmitter-side antennas; and successively transmitting 232 at least two of the signals at different points in time on the corresponding ones of the plurality of transmitter-side antennas. And the method may comprise successively receiving 234 the signals of the at least one sequence on the first receiver-side antenna, performing 236 an error check for a data packet comprised in a received signal of the at least one sequence, and suspending receiving 238 of subsequent signals of the at least one sequence when a result of the error check indicates a successful reception.

The described method may allow implementing the advantages and characteristics of the described diversity antenna system as part of a method of transmitting data packets between a diversity transmitter having a plurality of transmitter-side antennas and a receiver having at least a first receiver-side antenna.

The described method may comprise measuring one or more quality characteristics of signals being received on the first receiver-side antenna and on at least a second receiver-side antenna, and selecting a best receiver-side antenna depending on the one or more measured quality characteristics.

Figure 13:
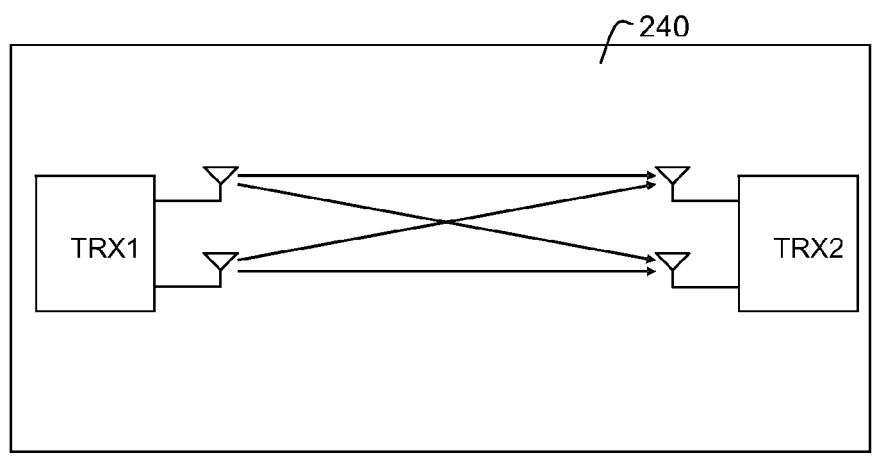
FIG. 13 shows a schematic block diagram of an example of an embodiment of a short range device (SRD) application.

Referring now to FIG. 13, a schematic block diagram of an example of an embodiment of a short range device (SRD) application 240 is shown. SRD applications usually comprise transmitters and receivers communicating within a range of some meters, e.g. 5 m. The SRD application may comprise a diversity receiver or a diversity transceiver as described above. The SRD application may for example be a medical application, for example a body-worn insulin pump and a remote control device, for example implemented in a PDA (personal digital assistant). Here a stable and highly reliable communication between transmitter and receiver independently of position and orientation of devices may be of high importance. However, the presented diversity receiver and transceiver may for example also be used with any handheld equipment requiring a robust wireless link between communication entities, for example for automotive medical, industrial or home automation applications, such as passive entry systems. For example, a tyre pressure monitoring system may be an automotive SRD application.

Furthermore, a computer program product may comprise code portions for implementing parts of a diversity transceiver or for implementing parts of a diversity receiver as described above when run on a programmable apparatus. The invention may for example at least partly be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims.

Because the apparatuses implementing the present invention are, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different systems. For example, although FIG. 9 and the discussion thereof describe an exemplary diversity receiver, this exemplary receiver is presented merely to provide a useful reference in discussing various aspects of the invention. Of course, the description has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or impose an alternate decomposition of functionality upon various logic blocks.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. The programmable apparatus may for example comprise a processing device or processing unit being one or more of a group consisting of: microprocessor, central processing unit, a graphics processor, coprocessor, digital signal processor, embedded processor application specific integrated circuit (ASIC), field programmable gate array (FPGA), programmable logic array (PLA), a device implementing a state machine, a microcontroller unit (MCU).

Furthermore, the devices may be physically distributed over a number of apparatuses, while functionally operating as a single device. In one embodiment, receiver 112 is a part of a communication device such as a short range device. In another embodiment, a part of receiver 112 may be comprised in a programmable apparatus for example being a distributed computer system. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A diversity receiver, comprising:
   a plurality of receiving paths connected to a receiver circuit, wherein
      each of said receiving paths comprises an antenna configured to receive a signal,
      each antenna is connected to a matching network
      each matching network is connected to a receive amplifier; and
   a signal level comparison circuit, coupled to the receiver circuit, and configured to provide a relative comparison value indicating one of said receiving paths receiving said signal with a relative maximum strength, said signal level comparison circuit comprising
      a comparator circuit connected to said receiver circuit and configured to receive a currently received signal level, and
      a logic control unit, coupled to the comparator circuit, configured to select one of said receive paths to provide said currently received signal to said receiver circuit.

2. The diversity receiver as claimed in claim 1, wherein said signal level comparison circuit comprises at least one sample & hold buffer circuit, connected to said receiver circuit and said comparator circuit, and configured to receive control signals from said logic control unit.

3. The diversity receiver as claimed in claim 1, wherein said currently received signal comprises at least one data packet, and said receiver circuit is configured to provide at least a part of the at least one data packet to said logic control unit.

4. The diversity receiver as claimed in claim 1, wherein said diversity receiver is implemented as a diversity transceiver for bi-directional communication, wherein said logic control unit is arranged to switch said diversity transceiver either into a transmit mode or a receive mode and said antennas are arranged as receiver-side antennas or as transmitter-side antennas depending on said mode.

5. The diversity receiver as claimed in claim 4, comprising a phase-locked loop circuit connected to said receiver circuit and a transmit amplifier driver circuit.

6. The diversity receiver as claimed in claim 4 further, comprising:
   a plurality of transmit amplifiers, wherein
      said antennas, matching networks and transmit amplifiers are connected as a plurality of transmit paths being connected to said transmit amplifier driver circuit,
      said logic control unit is configured to activate, in said receive mode, one of said receive paths or sequentially activating two or more of said receive paths, and
      said logic control unit is configured to activate, in said transmit mode, one of said transmit paths or sequentially activating two or more of said transmit paths.

7. The diversity receiver as claimed in claim 1, wherein said receiver is implemented as a single integrated circuit.

8. A short range device application comprising a diversity receiver as claimed in claim 1.

9. The diversity receiver as claimed in claim 2, wherein said diversity receiver is implemented as a diversity transceiver for bi-directional communication, wherein said logic control unit is arranged to switch said diversity transceiver either into a transmit mode or a receive mode and said antennas are arranged as receiver-side antennas or as transmitter-side antennas depending on said mode.

10. The diversity receiver as claimed in claim 9 further comprising a phase-locked loop circuit connected to said receiver circuit and a transmit amplifier driver circuit.

11. The diversity receiver as claimed in claim 9 further comprising:
   a plurality of transmit amplifiers, wherein
      said antennas, matching networks and transmit amplifiers are connected as a plurality of transmit paths being connected to said transmit amplifier driver circuit,
      said logic control unit is configured to activate, in said receive mode, one of said receive paths or sequentially activating two or more of said receive paths, and
      said logic control unit is configured to activate, in said transmit mode, one of said transmit paths or sequentially activating two or more of said transmit paths.

12. A diversity transceiver, comprising:
   one receiver circuit;
   one transmit amplifier driver circuit;
   one phase-locked loop circuit;
   one logic control unit; and
   a plurality of antennas, matching networks, receive amplifiers and transmit amplifiers, wherein
      said plurality of antennas, matching networks and receive amplifiers are connected as a corresponding plurality of receive paths being connected to said receiver circuit, and
      said plurality of antennas, matching networks and transmit amplifiers are connected as a corresponding plurality of transmit paths being connected to said transmit amplifier driver circuit,
      said logic control unit is capable of activating in a receive mode one of said receive paths or sequentially activating two or more of said receive paths, and
      said logic control unit is capable of activating in a transmit mode one of said transmit paths or sequentially activating two or more of said transmit paths.

13. The diversity transceiver as claimed in claim 12, wherein said diversity transceiver is implemented as a single integrated circuit.

14. A short range device application comprising a diversity transceiver as claimed in claim 12.

* * * * *